(12) United States Patent
Hoshina et al.

(10) Patent No.: US 9,698,446 B2
(45) Date of Patent: Jul. 4, 2017

(54) LITHIUM-ION CONDUCTING OXIDE, SOLID ELECTROLYTE SECONDARY BATTERY AND BATTERY PACK

(71) Applicant: KABUSHIKI KAISHA TOSHIBA, Minato-ku, Tokyo (JP)

(72) Inventors: Keigo Hoshina, Yokohama (JP); Hiroki Inagaki, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 459 days.

(21) Appl. No.: 14/209,178

(22) Filed: Mar. 13, 2014

(65) Prior Publication Data
US 2014/0193695 A1 Jul. 10, 2014

Related U.S. Application Data

(63) Continuation of application No. PCT/JP2012/056424, filed on Mar. 13, 2012.

(51) Int. Cl.
| | | |
|---|---|---|
| H01M 10/0562 | (2010.01) | |
| H01M 4/485 | (2010.01) | |
| H01M 10/0525 | (2010.01) | |

(52) U.S. Cl.
CPC ....... *H01M 10/0562* (2013.01); *H01M 4/485* (2013.01); *H01M 10/0525* (2013.01); *Y02T 10/7011* (2013.01)

(58) Field of Classification Search
CPC ............. H01M 4/485; H01M 10/0525; H01M 10/0562; Y02T 10/7011; Y02E 60/122

USPC .......................................... 429/156, 323, 322
See application file for complete search history.

(56) References Cited

U.S. PATENT DOCUMENTS

2013/0260231 A1* 10/2013 Hua ...................... H01M 4/364
429/211

FOREIGN PATENT DOCUMENTS

| JP | 2009-238739 A | 10/2009 |
|---|---|---|
| JP | 2010-102929 A | 6/2010 |
| JP | 2010-165688 A | 7/2010 |
| JP | 2011-204389 A | 10/2011 |
| JP | 2012-31025 A | 2/2012 |

OTHER PUBLICATIONS

Peng et al. Use of B2O3 to improve Li+ ion transport in LiTi2(PO4)3 based ceramics Journal of Power Sources 197 (2012) 310-313 Available on line Sep. 21, 2011.*
IPRP dated Sep. 25, 2014 from PCT/JP2012/056424, 12 pages.
Komiya, et al.; "Effects of LIF Addition in Lithium Ion Conductor La0.56Li0.33TiO3"; Key Engineering Materials, vol. 445, 2010, pp. 229-232.

(Continued)

*Primary Examiner* — Gary Harris
(74) *Attorney, Agent, or Firm* — Amin, Turocy & Watson LLP

(57) ABSTRACT

According to one embodiment, a solid electrolyte secondary battery includes a positive electrode, a negative electrode and a solid electrolyte layer. The solid electrolyte layer includes a lithium-ion conducting oxide containing at least one element selected from the group consisting of B, N, F and S, wherein a total content of the element in the lithium-ion conducting oxide is 0.05% by mass or more and 1% by mass or less.

14 Claims, 3 Drawing Sheets

(56) References Cited

OTHER PUBLICATIONS

Peng, et al.; "Use of B2O3 to improve Li+-ion transport in LiTi2(PO4)3-based ceramics"; Journal of Power Sources, 197, 2012, pp. 310-313.
International Search Report (with English translation) dated Jun. 12, 2012 from corresponding PCT/JP2012/056424, 10 pages.
Written Opinion dated Jun. 12, 2012 from corresponding PCT/JP2012/056424, 7 pages.

* cited by examiner

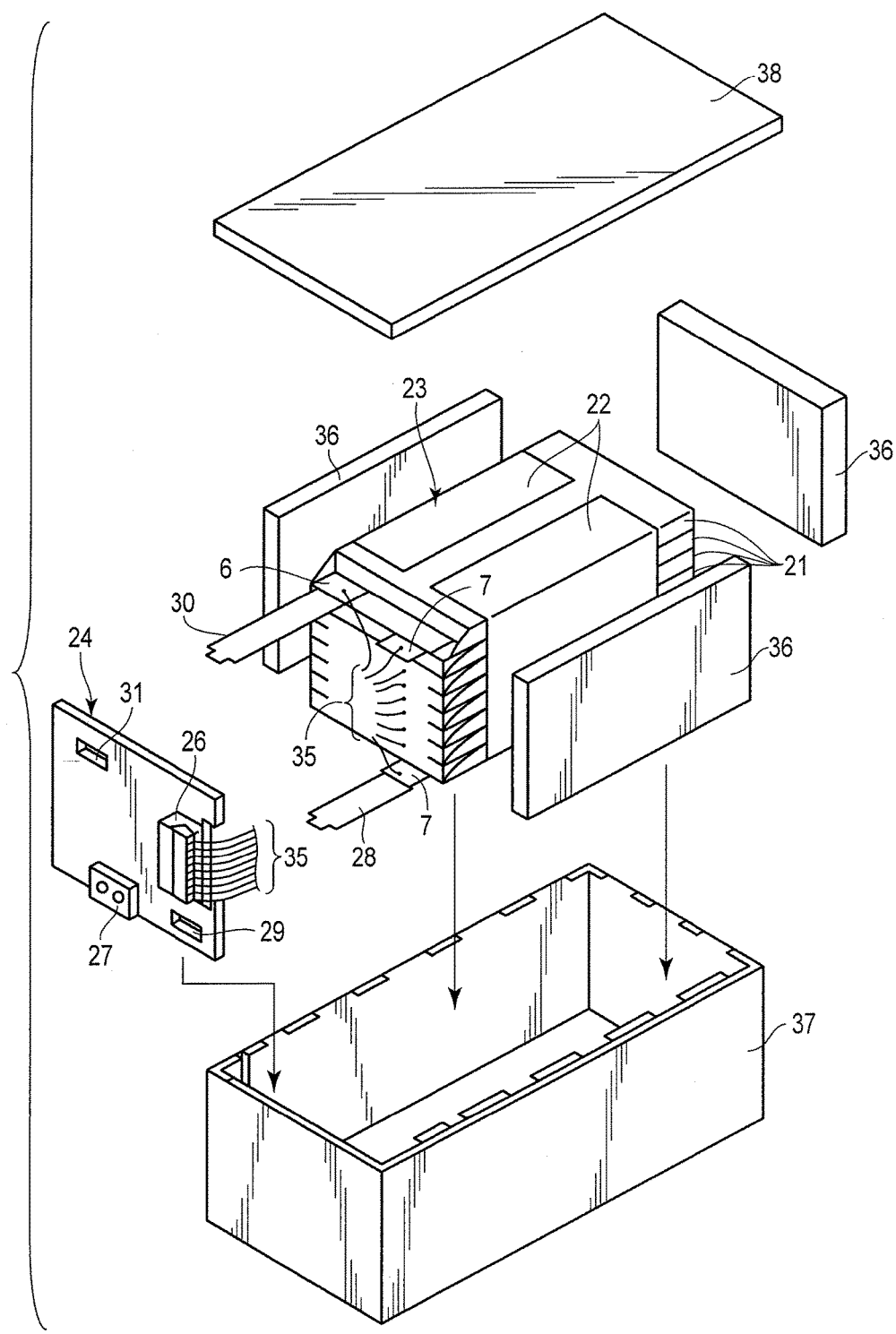
F I G. 3

LITHIUM-ION CONDUCTING OXIDE, SOLID ELECTROLYTE SECONDARY BATTERY AND BATTERY PACK

CROSS REFERENCE TO RELATED APPLICATIONS

This application is a Continuation Application of PCT Application No. PCT/JP2012/056424, filed Mar. 13, 2012, the entire contents of which are incorporated herein by reference.

FIELD

Embodiments described herein relate generally to a lithium-ion conducting oxide, a solid electrolyte secondary battery and a battery pack.

BACKGROUND

It has been studied that a common lithium-ion secondary battery is applied to a vehicle-mounted power supply for hybrid automobiles, plug-in hybrid automobiles, electric vehicles and the like, and large-sized equipment such as a stationary power supply for storing power.

When the common lithium-ion secondary battery is applied to large-sized equipment, it is important to increase the battery in safety. The lithium-ion secondary battery is likely to leak a liquid and generate gas because it employs a non-aqueous electrolyte solution.

BRIEF DESCRIPTION OF THE DRAWINGS

FIG. 3 is an exploded perspective view of a battery pack according to an embodiment.

DETAILED DESCRIPTION

Figure 1:
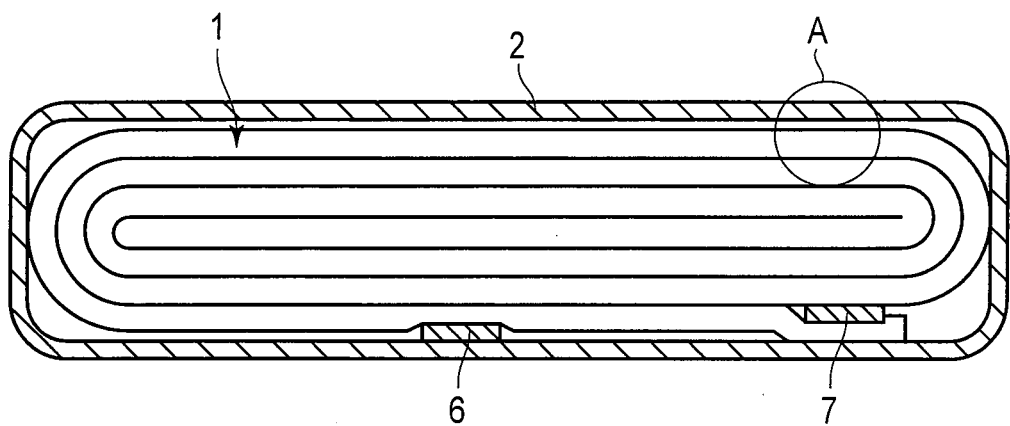
FIG. 1 is a cross-sectional view of a flattened solid electrolyte secondary battery according to an embodiment.

Below are detailed descriptions of a lithium-ion conducting oxide, a solid electrolyte secondary battery and a battery pack according to the embodiment.

In general, a lithium-ion conducting oxide (a first lithium-ion conducting oxide) according to the embodiment includes at least one element selected from the group consisting of B, N, F and S, wherein the total content of the element in the lithium-ion conducting oxide is 0.05% by mass or more and 1% by mass or less.

A lithium-ion conducting oxide (a second lithium-ion conducting oxide) according to the embodiment includes at least one element selected from H and C, wherein the total content of the element in the lithium-ion conducting oxide is 0.03% by mass or more and 0.2% by mass or less.

When the number of elements included in the lithium-ion conducting oxide is one, the "total amount of content of the element" means an amount of content of the one element. When the number of elements is two or more, the "total amount of content of the element" means an amount of content of the sum of the two or more elements.

The lithium-ion conducting oxide includes, for example, an oxide having a perovskite structure and expressed by $Li_{3x}La_{2/3-x}TiO_3$ (0<x<2/3) and an oxide having a garnet structure and expressed by $Li_{5+x}La_3M_{2-x}Zr_xO_{12}$, where M is at least one of Nb and Ta, and x is 0≤x≤2. The lithium-ion conducting oxide includes other oxides called LISICON, LIPON and NASICON.

As the lithium-ion conducting oxide having a perovskite structure, $Li_{0.35}La_{0.55}TiO_3$ is preferable because its ion conductivity is high. As the oxide having a garnet structure, $Li_5La_3Nb_2O_{12}$, $Li_5La_3Ta_2O_{12}$ and $Li_7La_3Zr_2O_{12}$ are preferable. As the oxide called LISICON, $Li_{14}ZnGe_4O_{16}$ is preferable. As the oxide called NASICON, $Li_{1+x}Al_xTi_{2-x}(PO_4)_3$ and $Li_{1+x}Al_xGe_{2-x}(PO_4)_3$ (0<x≤0.5) are preferable and $Li_{1.5}Al_{0.5}Ge_{1.5}(PO_4)_3$ is particularly preferable because its ion conductivity is high and its reducing tolerance is high.

When the total content of B, N, F and S in the first lithium-ion conducting oxide falls outside the range of 0.05% by mass or more and 1% by mass or less, it becomes difficult to increase the lithium-ion conductivity of the oxide. More preferably, the total content of the element is 0.1% by mass or more and 0.6% by mass or less.

When the total content of H and C in the second lithium-ion conducting oxide falls outside the range of 0.03% by mass or more and 0.2% by mass or less, it becomes difficult to increase the lithium-ion conductivity of the oxide. More preferably, the total content of the element is 0.05% by mass or more and 0.1% by mass or less.

Since the first lithium-ion conducting oxide according to the embodiment includes at least one element selected from the group consisting of B, N, F and S and the total content of the element is 0.05% by mass or more and 0.1% by mass or less, and the second lithium-ion conducting oxide according to the embodiment includes at least one element selected from H and C and the total content of the element is 0.03% by mass or more and 0.2% by mass or less, its lithium-ion conductivity can be increased. It is commonly known that the lithium-ion conducting oxide has a high grain boundary resistance; however, the grain boundary resistance can be lowered if the oxide includes a given number of elements. Though the details are uncertain, it is considered that the element exists at the grain boundary of lithium-ion conducting oxide grains and thus lithium ions are smoothly moved on the grain boundary.

Below is a description of a solid electrolyte secondary battery according to the embodiment.

In general, a solid electrolyte secondary battery according to the embodiment comprises a positive electrode, a negative electrode and a solid electrolyte layer, wherein the solid electrolyte layer comprises a lithium-ion conducting oxide including at least one element selected from the group consisting of B, N, F and S, a total content of the element in the lithium-ion conducting oxide being 0.05% by mass or more and 1% by mass or less, or a lithium-ion conducting oxide including at least one element selected from H and C, a total content of the element in the lithium-ion conducting oxide being 0.03% by mass or more and 0.2% by mass or less.

The positive electrode, negative electrode and solid electrolyte layer of the solid electrolyte secondary battery will be described in detail below.

1) Positive Electrode

The positive electrode comprises a current collector and a positive electrode layer formed on at least one surface of the current collector and containing an active material.

The current collector can be formed of aluminum foil, aluminum alloy foil containing at least one element selected from the group consisting of Mg, Ti, Zn, Mn, Fe, Cu and Si, or the like.

As the active material, different oxides can be used.

Examples of the oxides include a lithium cobalt composite oxide (e.g., $Li_xCO_2$), a lithium nickel composite oxide (e.g., $Li_xNiO_2$), a lithium nickel cobalt composite oxide (e.g., $LiNi_{1-y}Co_yO_2$), a lithium manganese cobalt composite oxide (e.g., $Li_xMn_yCo_{1-y}O_2$), a lithium nickel cobalt manganese composite oxide (e.g., $LiNi_{1-y-z}Co_yMn_zO_2$), a lithium nickel cobalt aluminum composite oxide (e.g., $LiNi_{1-y-z}Co_yAl_zO_2$), a lithium manganese composite oxide having a spinel structure (e.g., $Li_xMn_2O_4$), a lithium manganese nickel composite oxide having a spinel structure (e.g., $Li_xMn_{2-y}Ni_yO_4$), a lithium phosphorus oxide having an olivine structure (e.g., $Li_xFePO_4$, $Li_xFe_{1-y}Mn_yPO_4$, $Li_xCoPO_4$), and a vanadium oxide (e.g., $V_2O_5$). It is preferable that x, y and z satisfy the following expressions: $0<x\le 1$, $0\le y\le 1$ and $0\le z\le 1$.

As the active material, the foregoing compounds can be used alone or in combination.

It is more desirable that the active material generate a high positive electrode voltage. Such an active material includes, for example, a lithium manganese composite oxide ($Li_xMn_2O_4$), a lithium manganese nickel composite oxide having a spinel structure ($Li_xMn_{2-y}Ni_yO_4$), a lithium nickel composite oxide ($Li_xNiO_2$), a lithium cobalt composite oxide ($Li_xCoO_2$), a lithium nickel cobalt composite oxide ($LiNi_{1-y}Co_yO_2$), a lithium manganese cobalt composite oxide ($Li_xMn_yCo_{1-y}O_2$), a lithium nickel cobalt manganese composite oxide (e.g., $LiNi_{1-y-z}Co_yMn_zO_2$) and a lithium iron phosphate ($Li_xFePO_4$). It is desirable that x, y and z satisfy the following expressions: $0<x\le 1$, $0\le y\le 1$ and $0\le z\le 1$.

It is desirable that the particle diameter of the active material is 1 μm or less. An active material whose particle diameter is 1 μm or less allows lithium ions to diffuse smoothly in the solid electrolyte layer.

It is desirable that the specific surface area of the active material is 0.5 $m^2/g$ or more and 30 $m^2/g$ or less. An active material in which specific surface area is 0.5 $m^2/g$ or more, makes it possible to secure an adequate lithium-ion storage/discharge site. An active material in which specific surface area is 30 $m^2/g$ or less, is easy to handle in terms of industry. Unlike in a non-aqueous electrolyte secondary battery using an organic solvent, in the solid electrolyte secondary battery, a decomposition reaction of the electrolyte is hard to cause on the electrode surface of the battery. For this reason, even if an active material whose specific surface is large is used, its resistance increase becomes small at the electrode interface. It is more desirable that the specific surface of the active material is 5 $m^2/g$ or more and 20 $m^2/g$ or less.

The positive electrode layer may contain not only the active material but also a conductive agent, a binder and the above-mentioned first lithium-ion conducting oxide or the above-mentioned second lithium-ion conducting oxide.

The conductive agent increases the power collection performance of the current collector and decreases the contact resistance between the active material and the current collector. Examples of the conductive agent include a carbonaceous substance such as acetylene black, carbon black, graphite, carbon nanofiber and carbon nanotube.

The binder is used to bind the active material and conductive agent with the current collector. Examples of the binder include a lithium-ion conducting polymer, such as polytetrafluoroethylene (PTFE), polyvinylidene fluoride, fluorinated rubber, and polyethylene oxide containing lithium salt.

The above-mentioned first lithium-ion conducting oxide or the above-mentioned second lithium-ion conducting oxide improves lithium-ion conductivity between the positive electrode layer and the solid electrolyte layer.

When the lithium-ion conducting oxide having a perovskite structure is used, it is desirable that a spinel lithium manganese composite oxide and a spinel lithium manganese nickel composite oxide be used as active materials. This is because impurities are difficult to generate when the contact between the lithium-ion conducting oxide having a perovskite structure and the active material is improved in the heat treatment. If, in a lithium-ion conducting oxide of $Li_{0.35}La_{0.55}TiO_3$, a lithium cobalt composite oxide ($LiCoO_2$) is used as the active material, impurities are easy to generate in the heat treatment.

When the lithium-ion conducting oxide having a garnet structure, such as $Li_5LaTa_2O_{12}$ and $Li_7La_3Zr_2O_{12}$ is used, it is desirable that a lithium cobalt composite oxide, a lithium nickel cobalt manganese composite oxide or a spinel lithium manganese nickel composite oxide is used as active material. When the lithium-ion conducting oxide having a NASICON structure, such as $Li_{1+x}Al_xGe_{2-x}(PO_4)_3$ ($0<x\le 0.5$) is used, it is desirable that an olivine lithium phosphorus oxide is used as an active material.

In the positive electrode layer, it is desirable that the active material, the conductive agent, the binder and the above-mentioned first lithium-ion conducting oxide or the above-mentioned second lithium-ion conducting oxide, should be compounded in the ratio among 50% by mass or more and 95% by mass or less, 2% by mass or more and 30% by mass or less, 2% by mass or more and 20% by mass or less, and 10% by mass or more and 30% by mass or less, respectively. The conductive agent can bring about the above-described advantage if its amount is set at 2% by mass or more. Furthermore, the conductive agent can be increased in both energy density and conductivity if its amount is set at 30% by mass or less. The binder increases the strength of the positive electrode sufficiently if its amount is set at 2% by mass or more. Furthermore, the binder, which is an insulating material, can decrease its composition amount in the positive electrode and also decrease the internal resistance if the amount is set at 20% by mass or less. The above-mentioned first lithium-ion conducting oxide or the above-mentioned second lithium-ion conducting oxide can be improved in lithium-ion conductivity in the positive electrode if its amount is set at 10% by mass or more. Moreover, the above-mentioned first lithium-ion conducting oxide or the above-mentioned second lithium-ion conducting oxide can be increased in both energy density and lithium-ion conductivity if its amount is set at 30% by mass or less.

The positive electrode can be produced by the following method. First, the active material, the conductive agent, the binder and the above-mentioned first lithium-ion conducting oxide or the above-mentioned second lithium-ion conducting oxide are suspended in a solvent to prepare slurry. This slurry is applied to one or both of the surfaces of the current collector and dried to form a positive electrode layer. After that, the positive electrode layer is pressed. The positive electrode can be produced by the following method, too. The active material, the conductive agent, the binder and the above-mentioned first lithium-ion conducting oxide or the above-mentioned second lithium-ion conducting oxide, are molded into a pellet to form a positive electrode layer. This positive electrode layer can be formed on one or both of the surfaces of the current collector to prepare a positive electrode.

2) Negative Electrode

The negative electrode includes a current collector and a negative electrode layer formed on one or both of the surfaces of the current collector and containing an active material.

It is desirable that the current collector should be formed of aluminum foil, aluminum alloy foil or copper foil. It is more desirable that it should be formed of aluminum foil or aluminum alloy foil including elements such as Mg, Ti, Zn, Mn, Fe, Cu and Si.

The active material includes a metal sulfide, a metal oxide, carbon, an alloy, and the like.

The metal sulfide includes a titanium sulfide, an iron sulfide, and the like. It is desirable that the metal sulfide be an iron sulfide.

Examples of the metal oxide include a titanium composite oxide, a niobium composite oxide, a silicon composite oxide, an iron oxide, and the like. It is desirable that the metal oxide be a titanium composite oxide and it is more desirable that the metal oxide be spinel lithium titanate.

Examples of the carbon include graphite, hard carbon and the like. It is desirable that the alloy be an alloy of Li and at least one metal selected from the group consisting of Si, Al, Sn and In.

The negative electrode layer may contain not only the active material but also a conductive agent, a binder and the above-mentioned first lithium-ion conducting oxide or the above-mentioned second lithium-ion conducting oxide.

The conductive agent increases the power collection performance of the current collector and decreases the contact resistance between the active material and the current collector. Examples of the conductive agent include a carbonaceous substance such as acetylene black, carbon black, graphite, carbon nanofiber and carbon nanotube.

The binder is used to improve in binding the active material and conductive agent with the current collector. Examples of the binder include a lithium-ion conducting polymer, such as polytetrafluoroethylene (PTFE), polyvinylidene fluoride, fluorinated rubber, and polyethylene oxide containing lithium salt.

The above-mentioned first lithium-ion conducting oxide or the above-mentioned second lithium-ion conducting oxide improves in lithium ion conductivity between the negative electrode layer and the solid electrolyte layer. As the lithium ion conducting oxide, for example, the foregoing compounds can be used.

It is desirable that the active material, the conductive agent, the binder, and the above-mentioned first lithium-ion conducting oxide or the above-mentioned second lithium-ion conducting oxide, should be compounded in the ratio among 50% by mass or more and 96% by mass or less, 2% by mass or more and 30% by mass or less, 2% by mass or more and 30% by mass or less, and 10% by mass or more and 30% by mass or less, respectively. If the amount of the conductive agent is less than 2% by mass, it is likely that the negative electrode layer will decrease in its power collection performance and the large-current characteristics of the non-aqueous electrolyte secondary battery will deteriorate. If the amount of the binder is less than 2% by mass, it is likely that the binding force between the active material layer and the current collector will lower and the cycle characteristics will deteriorate. In terms of a large battery capacity, it is desirable that the amounts of the conductive agent, the binder and the lithium-ion conducting oxide should be 30% by mass or less.

The negative electrode can be produced by the following method. First, the active material, the conductive agent, the binder and the above-mentioned first lithium-ion conducting oxide or the above-mentioned second lithium-ion conducting oxide, are suspended in a solvent to prepare slurry. This slurry is applied to one or both of the surfaces of the current collector and dried to form a negative electrode layer. After that, the negative electrode layer is pressed. The negative electrode can be produced by the following method, too. The active material, the conductive agent, the binder and the above-mentioned first lithium-ion conducting oxide or the above-mentioned second lithium-ion conducting oxide, are molded into a pellet to form a negative electrode layer. This negative electrode layer can be formed on one or both of the surfaces of the current collector to prepare a negative electrode.

3) Solid Electrolyte Layer

The solid electrolyte contains a first lithium-ion conducting oxide including at least one element selected from the group consisting of B, N, F and S, wherein a total content of the element in the lithium-ion conducting oxide is 0.05% by mass or more and 1.0% by mass or less or a second lithium-ion conducting oxide including at least one element selected from H and C, wherein a total content of the element in the lithium-ion conducting oxide is 0.03% by mass or more and 0.2% by mass or less.

The lithium-ion conducting oxide includes, for example, an oxide having a perovskite structure and expressed by $Li_{3x}La_{2/3-x}TiO_3 (0<x<2/3)$ and an oxide having a garnet structure and expressed by $Li_{5+x}La_3M_{2-x}Zr_xO_{12}$, where M is at least one of Nb and Ta, and x is $0 \leq x \leq 2$. The lithium-ion conducting oxide includes other oxides called LISICON, LIPON and NASICON.

As the lithium-ion conducting oxide having a perovskite structure, $Li_{0.35}La_{0.55}TiO_3$ is preferable because its ion conductivity is high. As the oxide having a garnet structure, $Li_5La_3Nb_2O_{12}$, $Li_5La_3Ta_2O_{12}$ and $Li_7La_3Zr_2O_{12}$ are preferable. As the oxide called LISICON, $Li_{14}ZnGe_4O_{16}$ is preferable. As the oxide called NASICON, $Li_{1+x}Al_xTi_{2-x}(PO_4)_3$ and $Li_{1+x}Al_xGe_{2-x}(PO_4)_3$ $(0<x\leq 0.5)$ are preferable and $Li_{1.5}Al_{0.5}Ge_{1.5}(PO_4)_3$ is particularly preferable because its ion conductivity is high and its reducing tolerance is high.

When the total content of B, N, F and S in the first lithium-ion conducting oxide falls outside the range of 0.05% by mass or more and 1% by mass or less, it becomes difficult to increase the lithium-ion conductivity of the oxide. More preferably, the total content of the element is 0.1% by mass or more and 0.6% by mass or less.

When the total content of H and C in the second lithium-ion conducting oxide falls outside the range of 0.03% by mass or more and 0.2% by mass or less, it becomes difficult to increase the lithium-ion conductivity of the oxide. More preferably, the total content of the element is 0.05% by mass or more and 0.1% by mass or less.

The solid electrolyte layer may contain a plurality of lithium-ion conducting oxides selected from the group consisting of the above first and second lithium-ion conducting oxides. For example, the solid electrolyte layer may contain $Li_{0.35}La_{0.55}TiO_3$ having a predetermined amount of F, and $Li_5La_3Ta_2O_{12}$ having a predetermined amount of C and H, or contain $Li_7La_3Zr_2O_{12}$ having a predetermined amount of B, and $Li_{1.5}Al_{0.5}Ge_{1.5}(PO_4)_3$ having a predetermined amount of F.

The solid electrolyte layer can be formed on the positive or negative electrode layer by the coating method or the like. To form a solid electrolyte layer on the positive electrode layer, a lithium-ion conducting oxide including the above element by a predetermined amount and a binder are dispersed into a solvent to prepare slurry. After that, the slurry is applied to the positive electrode layer and dried. The solid electrolyte layer can also be formed by sintering a lithium-ion conductive oxide including the above element by a predetermined amount.

Figure 2:
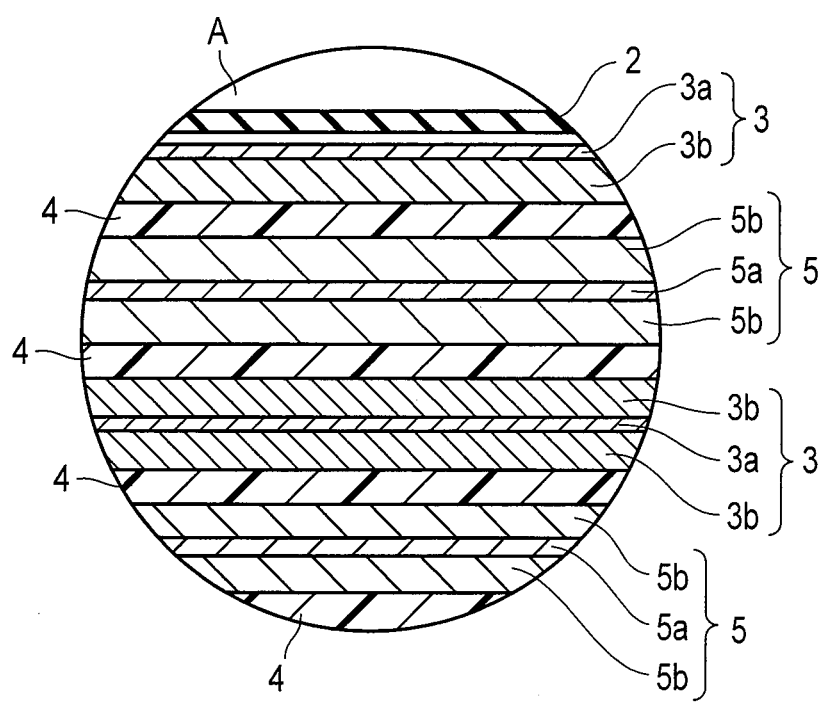
FIG. 2 is an enlarged cross-sectional view of portion A of FIG. 1.

The solid electrolyte secondary battery according to the embodiment will be described more specifically with reference to FIGS. 1 and 2. FIG. 1 is a cross-sectional view of a flattened solid electrolyte secondary battery according to the embodiment, and FIG. 2 is an enlarged cross-sectional view of portion A of FIG. 1. FIGS. 1 and 2 are schematic views for facilitating descriptions and understanding of the invention. The battery shown in these figures may differ from the actual battery in shape, dimension, ratio or the like, which can be changed appropriately in consideration of the following descriptions and well-known art.

A flattened rolled electrode group 1 is housed in a sac-like exterior container 2 that is formed of a laminated film with a metal layer between two resin films. The flattened rolled electrode group 1 is formed by spirally rolling a laminate, which includes a negative electrode 3, a solid electrolyte layer 4, a positive electrode 5 and a solid electrolyte layer 4 from outside, and pressing the rolled laminate.

The outermost negative electrode 3 is configured by forming a negative electrode layer 3b as an active material on one inward side of a current collector 3a, as shown in FIG. 2. The other negative electrode 3 is configured by forming a negative electrode layer 3b on either side of the current collector 3a. The negative electrode layer 3b may contain not only the active material but also a conductive agent, a binder and the above-mentioned first lithium-ion conducting oxide or the above-mentioned second lithium-ion conducting oxide.

The positive electrode 5 is configured by forming a positive electrode layer 3b on either side of a current collector 5a. The positive electrode layer 5b may contain not only the active material but also a conductive agent, a binder and the above-mentioned first lithium-ion conducting oxide or the above-mentioned second lithium-ion conducting oxide. The solid electrolyte layers 4 are each formed between the negative electrode layer 3b of the negative electrode 3 and the positive electrode layer 5b of the positive electrode 5.

In the proximity of the circumference of the rolled electrode group 1, a negative electrode terminal 6 is connected to the current collector 3a of the outermost negative electrode 3, and a positive electrode terminal 7 is connected to the current collector 5a of the positive electrode 5. These negative and positive electrode terminals 6 and 7 extend out from the opening of the sac-like exterior container 2. The opening of the sac-like exterior container 2 is heat-sealed with the positive electrode terminals 6 and 7 inserted therein; thus, the rolled electrode group 1 is completely sealed in the sac-like exterior container 2.

For the negative electrode terminal, for example, copper, stainless and aluminum can be used. Preferably, aluminum, especially an aluminum alloy containing elements such as Mg, Ti, Zn, Mn, Fe, Cu and Si, is used. To lower the contact resistance, it is desirable to use a material similar to that of the current collector.

The positive electrode terminal can be formed of materials whose potential is 3 V or higher and 5 V or lower with respect to lithium metal and which have electrical stability and conductivity. Specifically, the materials are aluminum and an aluminum alloy including elements, such as Mg, Ti, Zn, Mn, Fe, Cu and Si. To lower the contact resistance, it is desirable to use a material similar to that of the current collector.

The solid electrolyte secondary battery according to the above embodiment is of a flattened type. However, the battery can be shaped like a square, a cylinder, a coin, a button, a sheet, a laminate or the like. Furthermore, the solid electrolyte secondary battery may include a large-sized battery loaded into two to four-wheel vehicles as well as a small-sized battery mounted on portable electronic equipment and the like.

The solid electrolyte secondary battery described above comprises a solid electrolyte layer which contains a first lithium-ion conducting oxide, or a second lithium-ion conducting oxide, the first lithium-ion conducting oxide including at least one element selected from the group consisting of B, N, F and S, in which the total content of the element in the first lithium-ion conducting oxide is 0.05% by mass or more and 1% by mass or less, and the second lithium-ion conducting oxide including at least one element selected from H and C, in which the total content of the element in the second lithium-ion conducting oxide is 0.03% by mass or more and 0.2% by mass or less. The first lithium-ion conducting oxide or the second lithium-ion conducting oxide has a high lithium-ion conductivity and thus can be improved in large-current input/output characteristics of the solid electrolyte secondary battery.

Below is a detailed description of the battery pack according to the embodiment.

In general, the battery pack according to the embodiment comprises one or more solid electrolyte secondary battery (unit cell). When plurality of unit cells include, the unit cells are electrically connected in series, in parallel, or in series and in parallel.

The above battery pack will be described in detail with reference to FIGS. 3 and 4. For the unit cells, the flattened solid electrolyte secondary battery shown in FIG. 1 can be used.

Plural unit cells 21 are laminated such that the externally extended negative electrode terminal 6 and positive electrode terminal 7 are arranged in the same direction and fastened with an adhesive tape 22 to thereby constitute a battery assembly 23. These unit cells 21 are electrically connected each other in series as shown in FIG. 4.

A print wiring board 24 is disposed opposite to the side surface of the unit cell 21 from which the negative electrode terminal 6 and positive electrode terminal 7 extend. As shown in FIG. 4, a thermistor 25, a protective circuit 26 and an energizing terminal 27 connected to external devices are mounted on the print wiring board 24. An insulating plate (not shown) is attached to the surface of the print wiring substrate 24 facing the battery assembly 23 to avoid unnecessary connection with the wiring of the battery assembly 23.

One of the ends of the positive electrode side lead 28 is connected with the positive electrode terminal 7 positioned on the lowermost layer of the battery assembly 23 and the other end is inserted into a positive electrode side connector 29 of the print wiring board 24 to be electrically connected with the print wiring board 24. One of the ends of the negative electrode side lead 30 is connected with the negative electrode terminal 6 positioned on the uppermost layer of the battery assembly 23 and the other end is inserted into a negative electrode side connector 31 of the print wiring board 24 to be electrically connected with the print wiring board 24. These connectors 29 and 31 are connected to the protective circuit 26 through wirings 32 and 33 formed on the print wiring board 24.

The thermistor 25 is used to detect the temperature of the unit cell 21 and the detection signals are transmitted to the protective circuit 26. The protective circuit 26 can shut off a plus side wiring 34a and minus side wiring 34b between the protective circuit 26 and the energizing terminal 27 connected to external devices under a predetermined condition. The predetermined condition means, for example, the case where the temperature detected by the thermistor 25 is above a predetermined one. Also, the predetermined condition means, for example, the case of detecting overcharge, overdischarge and over-current of the unit cell 21. The detection of this overcharge and the like is made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIGS. 3 and 4, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery assembly 23 other than the side surface from which the positive electrode terminal 7 and negative electrode terminal 6 are projected.

The battery assembly 23 is housed in a housing tank 37 together with each protective sheet 36 and print wiring board 24. Specifically, the protective sheet 36 is disposed on each inside surface in the direction of the long side and on one of the inside surfaces in the direction of the short side of the receiving tank 37, and the print wiring board 24 is disposed on the other inside surface in the direction of the short side. The battery assembly 23 is positioned in a space enclosed by the protective sheets 36 and the print wiring board 24. A lid 38 is attached to the upper surface of the receiving tank 37.

Here, a thermally contracting tape may be used in place of the adhesive tape 22 to secure the battery assembly 23. In this case, after the protective sheet is disposed on both sides of the battery assembly and the thermally contracting tapes are wound around the battery assembly, the thermally contracting tape is contracted by heating to fasten the battery assembly.

Figure 4:
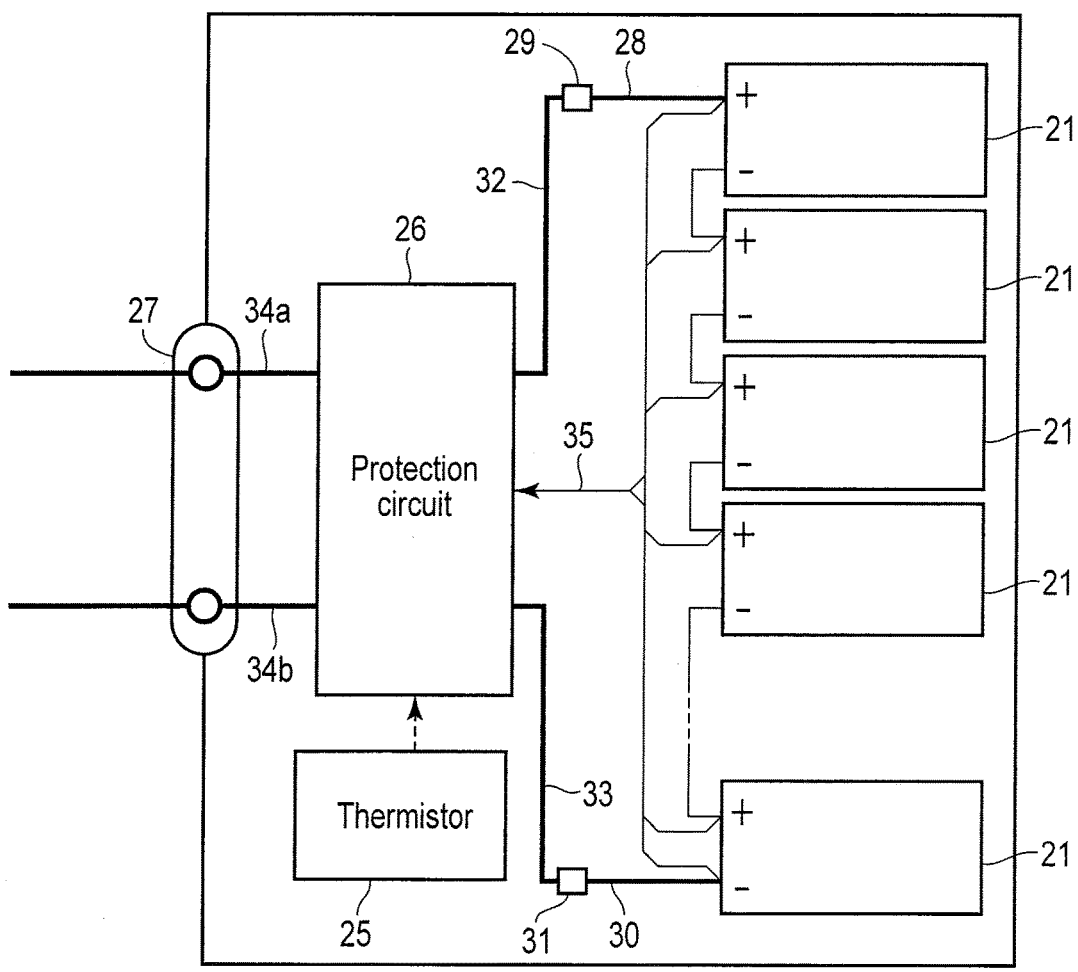
FIG. 4 is a block diagram showing an electrical circuit of the battery pack of FIG. 3.

The structure in which the unit cells 21 are connected in series is shown in FIGS. 3 and 4. However, with regard to these unit cells 21, either parallel or series-parallel cell connections may be used to increase the capacity of the battery. The assembled battery packs may be further connected in series or parallel.

The modes of the battery pack can be modified appropriately according to its use. It is desirable that the battery pack be used to improve cycle characteristics in large-current characteristics. Specifically, the battery pack can be used for power supplies of digital cameras, vehicle-mounted power supplies of two to four-wheel hybrid electric vehicles and two to four-wheel electric vehicles, power supplies of motor-assisted bicycles and the like. It is particularly desirable that the battery pack be used for the vehicle-mounted power supplies.

EXAMPLES

Below are descriptions of examples of the present invention. The present invention is not limited to the examples unless they depart from the scope of the subject matter of the present invention.

Example 1

Lithium acetate, lanthanum acetate and titanium tetraisopropoxide were dissolved in a mixed solvent of water and propanol such that their mol ratio Li:La:Ti is 0.35:0.55:1. The solvent was removed and dried and then the resultant matter was heated at 400° C. for five hours. Then, organic matter was removed by heat treatment at 400° C. to obtain a lithium lanthanum titanium oxide ($Li_{0.35}La_{0.55}TiO_3$). The obtained lithium lanthanum titanium oxide was mixed with LiF in a 200:1 ratio by weight. The mixture of the lithium lanthanum titanium oxide and LiF was shaped like a pellet. The pellet was heated at 1100° C. for twelve hours to obtain a pellet of a lithium-ion conducting oxide containing F.

The F content in the obtained pellet of a lithium-ion conducting oxide was determined by ICP (Inductively Coupled Plasma) analysis, with the result that it was confirmed that the lithium-ion conducting oxide contained 0.35% by mass of F.

Example 2

A pellet of a lithium-ion conducting oxide containing F was obtained by the same method as that of example 1, except that a lithium lanthanum titanium oxide and LiF were mixed in a 500:1 ratio by weight.

The F content in the obtained pellet of a lithium-ion conducting oxide was determined by ICP analysis, with the result that it was confirmed that the lithium-ion conducting oxide contained 0.14% by mass of F.

Example 3

A pellet of a lithium-ion conducting oxide containing F was obtained by the same method as that of example 1, except that a lithium lanthanum titanium oxide and LiF were mixed in an 80:1 ratio by weight.

The F content in the obtained pellet of a lithium-ion conducting oxide was determined by ICP analysis, with the result that it was confirmed that the lithium-ion conducting oxide contained 0.86% by mass of F.

Example 4

A pellet of a lithium-ion conducting oxide containing S was obtained by the same method as that of example 1, except that a lithium lanthanum titanium oxide and $Li_2S$ were mixed in a 200:1 ratio by weight.

The S content in the obtained pellet of a lithium-ion conducting oxide was determined by organic elemental analysis, with the result that it was confirmed that the lithium-ion conducting oxide contained 0.34% by mass of S.

Example 5

A pellet of a lithium-ion conducting oxide containing S was obtained by the same method as that of example 1, except that a lithium lanthanum titanium oxide and $Li_2S$ were mixed in a 500:1 ratio by weight.

The S content in the obtained pellet of a lithium-ion conducting oxide was determined by organic elemental analysis, with the result that it was confirmed that the lithium-ion conducting oxide contained 0.13% by mass of S.

Example 6

A pellet of a lithium-ion conducting oxide containing S was obtained by the same method as that of example 1, except that a lithium lanthanum titanium oxide and $Li_2S$ were mixed in an 80:1 ratio by weight.

The S content in the obtained pellet of a lithium-ion conducting oxide was determined by organic elemental analysis, with the result that it was confirmed that the lithium-ion conducting oxide contained 0.84% by mass of S.

Example 7

A pellet of a lithium-ion conducting oxide containing N was obtained by the same method as that of example 1, except that a lithium lanthanum titanium oxide and $Li_3N$ were mixed in a 200:1 ratio by weight.

The N content in the obtained pellet of a lithium-ion conducting oxide was determined by organic elemental analysis, with the result that it was confirmed that the lithium-ion conducting oxide contained 0.18% by mass of N.

Example 8

A pellet of a lithium-ion conducting oxide containing N was obtained by the same method as that of example 1, except that a lithium lanthanum titanium oxide and $Li_3N$ were mixed in a 400:1 ratio by weight.

The N content in the obtained pellet of a lithium-ion conducting oxide was determined by organic elemental analysis, with the result that it was confirmed that the lithium-ion conducting oxide contained 0.09% by mass of N.

Example 9

A pellet of a lithium-ion conducting oxide containing N was obtained by the same method as that of example 1, except that a lithium lanthanum titanium oxide and $Li_3N$ were mixed in a 50:1 ratio by weight.

The N content in the obtained pellet of a lithium-ion conducting oxide was determined by organic elemental analysis, with the result that it was confirmed that the lithium-ion conducting oxide contained 0.70% by mass of N.

Example 10

A pellet of a lithium-ion conducting oxide containing B was obtained by the same method as that of example 1, except that a lithium lanthanum titanium oxide and $LiBO_2$ were mixed in a 50:1 ratio by weight.

The B content in the obtained pellet of a lithium-ion conducting oxide was determined by organic elemental analysis, with the result that it was confirmed that the lithium-ion conducting oxide contained 0.33% by mass of B.

Example 11

A pellet of a lithium-ion conducting oxide containing B was obtained by the same method as that of example 1, except that a lithium lanthanum titanium oxide and $LiBO_2$ were mixed in a 200:1 ratio by weight.

The B content in the obtained pellet of a lithium-ion conducting oxide was determined by organic elemental analysis, with the result that it was confirmed that the lithium-ion conducting oxide contained 0.09% by mass of B.

Example 12

A pellet of a lithium-ion conducting oxide containing B was obtained by the same method as that of example 1, except that a lithium lanthanum titanium oxide and $LiBO_2$ were mixed in a 25:1 ratio by weight.

The B content in the obtained pellet of a lithium-ion conducting oxide was determined by organic elemental analysis, with the result that it was confirmed that the lithium-ion conducting oxide contained 0.65% by mass of B.

Example 13

Lithium acetate, lanthanum acetate and titanium tetraisopropoxide were dissolved in a mixed solvent of water and propanol such that their mol ratio Li:La:Ti is 0.35:0.55:1. The solvent was removed and dried and then the resultant matter was heated at 400° C. for five hours to obtain a lithium lanthanum titanium oxide ($Li_{0.35}La_{0.55}TiO_3$). The lithium lanthanum titanium oxide was treated by ball milling. More specifically, the lithium lanthanum titanium oxide was put in a zirconia container together with a zirconia ball (whose diameter is 1 mm) and ethanol in a volume ratio of 1:1:1 and then they were treated by ball milling at 500 rpm for one hour. After the ball milling treatment, the lithium lanthanum titanium oxide was shaped like a pellet. The pellet was heated at 1100° C. for twelve hours to obtain a pellet of a lithium-ion conducting oxide containing H and C.

The H and C contents in the obtained pellet of a lithium-ion conducting oxide were determined by organic elemental analysis, with the result that it was confirmed that the lithium-ion conducting oxide contained 0.05% by mass of H and 0.08% by mass of C.

Comparative Example 1

A pellet of a lithium-ion conducting oxide ($Li_{0.35}La_{0.55}TiO_3$) was obtained by the same method as that of example 1, except that LiF was not added.

Comparative Example 2

A pellet of a lithium-ion conducting oxide containing F was obtained by the same method as that of example 1, except that the lithium lanthanum titanium oxide was mixed with LiF in a 50:1 ratio by weight.

The F content in the obtained pellet of a lithium-ion conducting oxide was determined by ICP analysis, with the result that it was confirmed that the lithium-ion conducting oxide contained 1.43% by mass of F.

Comparative Example 3

A pellet of a lithium-ion conducting oxide containing F was obtained by the same method as that of example 1, except that the lithium lanthanum titanium oxide was mixed with LiF in a 2000:1 ratio by weight.

The F content in the obtained pellet of a lithium-ion conducting oxide was determined by ICP analysis, with the result that it was confirmed that the lithium-ion conducting oxide contained 0.03% by mass of F.

Comparative Example 4

A pellet of a lithium-ion conducting oxide containing S was obtained by the same method as that of example 1, except that the lithium lanthanum titanium oxide was mixed with $Li_2S$ in a 1500:1 ratio by weight.

The S content in the obtained pellet of a lithium-ion conducting oxide was determined by organic elemental analysis, with the result that it was confirmed that the lithium-ion conducting oxide contained 0.04% by mass of S.

Comparative Example 5

A pellet of a lithium-ion conducting oxide containing S was obtained by the same method as that of example 1, except that the lithium lanthanum titanium oxide was mixed with $Li_2S$ in a 40:1 ratio by weight.

The S content in the obtained pellet of a lithium-ion conducting oxide was determined by organic elemental analysis, with the result that it was confirmed that the lithium-ion conducting oxide contained 1.62% by mass of S.

Comparative Example 6

A pellet of a lithium-ion conducting oxide containing N was obtained by the same method as that of example 1, except that the lithium lanthanum titanium oxide was mixed with $Li_3N$ in a 1600:1 ratio by weight.

The N content in the obtained pellet of a lithium-ion conducting oxide was determined by organic elemental analysis, with the result that it was confirmed that the lithium-ion conducting oxide contained 0.02% by mass of N.

Comparative Example 7

A pellet of a lithium-ion conducting oxide containing N was obtained by the same method as that of example 1, except that the lithium lanthanum titanium oxide was mixed with $Li_3N$ in a 20:1 ratio by weight.

The N content in the obtained pellet of a lithium-ion conducting oxide was determined by organic elemental analysis, with the result that it was confirmed that the lithium-ion conducting oxide contained 1.73% by mass of N.

Comparative Example 8

A pellet of a lithium-ion conducting oxide containing B was obtained by the same method as that of example 1, except that the lithium lanthanum titanium oxide was mixed with $LiBO_2$ in a 1000:1 ratio by weight.

The B content in the obtained pellet of a lithium-ion conducting oxide was determined by organic elemental analysis, with the result that it was confirmed that the lithium-ion conducting oxide contained 0.01% by mass of B.

Comparative Example 9

A pellet of a lithium-ion conducting oxide containing B was obtained by the same method as that of example 1, except that the lithium lanthanum titanium oxide was mixed with $LiBO_2$ in a 10:1 ratio by weight.

The B content in the obtained pellet of a lithium-ion conducting oxide was determined by organic elemental analysis, with the result that it was confirmed that the lithium-ion conducting oxide contained 1.59% by mass of B.

Comparative Example 10

A pellet of a lithium-ion conducting oxide containing H and C was obtained by the same method as that of example 13, except that the lithium lanthanum titanium oxide was added together with a zirconia ball (whose diameter is 1 mm) and ethanol in a volume ratio of 1:1:5 and then they were treated by ball milling at 500 rpm for one hour.

The H and C contents in the obtained pellet of a lithium-ion conducting oxide were determined by organic elemental analysis, with the result that it was confirmed that the lithium-ion conducting oxide contained 0.13% by mass of H and 0.19% by mass of C.

Gold was applied by sputtering to both sides of each of the pellets obtained in above examples 1-13 and comparative examples 1-10 to form an electronic conductive path and calculate an ion conductivity at 25° C. by AC impedance measurement techniques. In this calculation, an arc due to the ion conductivity of crystal bulk was observed on the high-frequency side by the above measurement and an arc due to crystal grain boundary resistance was observed on the low-frequency side; thus, they were obtained as the entire ion conductivity.

The ion conductivities of the pellets obtained in examples 1-13 and comparative examples 1-10 are shown in Tables 1 and 2 below.

TABLE 1

| | Contained element and its contained amount (% by mass) | Lithium ion conductivity at 25° C. |
|---|---|---|
| Example 1 | F (0.35) | $2.9 \times 10^{-6} Scm^{-1}$ |
| Example 2 | F (0.14) | $2.5 \times 10^{-6} Scm^{-1}$ |
| Example 3 | F (0.86) | $2.0 \times 10^{-6} Scm^{-1}$ |
| Example 4 | S (0.34) | $1.1 \times 10^{-6} Scm^{-1}$ |
| Example 5 | S (0.13) | $1.0 \times 10^{-6} Scm^{-1}$ |
| Example 6 | S (0.84) | $2.4 \times 10^{-6} Scm^{-1}$ |
| Example 7 | N (0.18) | $2.2 \times 10^{-6} Scm^{-1}$ |
| Example 8 | N (0.09) | $1.4 \times 10^{-6} Scm^{-1}$ |
| Example 9 | N (0.70) | $2.8 \times 10^{-6} Scm^{-1}$ |
| Example 10 | B (0.33) | $4.0 \times 10^{-6} Scm^{-1}$ |
| Example 11 | B (0.09) | $3.3 \times 10^{-6} Scm^{-1}$ |
| Example 12 | B (0.65) | $3.9 \times 10^{-6} Scm^{-1}$ |
| Example 13 | H (0.05), C (0.08) | $5.6 \times 10^{-6} Scm^{-1}$ |

TABLE 2

| | Contained element and its contained amount (% by mass) | Lithium ion conductivity at 25° C. |
|---|---|---|
| Comparative Example 1 | — | $9.1 \times 10^{-7} Scm^{-1}$ |
| Comparative Example 2 | F (1.43) | $8.5 \times 10^{-7} Scm^{-1}$ |
| Comparative Example 3 | F (0.03) | $8.0 \times 10^{-7} Scm^{-1}$ |
| Comparative Example 4 | S (0.04) | $7.3 \times 10^{-7} Scm^{-1}$ |
| Comparative Example 5 | S (1.62) | $7.5 \times 10^{-7} Scm^{-1}$ |
| Comparative Example 6 | N (0.02) | $7.7 \times 10^{-7} Scm^{-1}$ |
| Comparative Example 7 | N (1.73) | $8.1 \times 10^{-7} Scm^{-1}$ |
| Comparative Example 8 | B (0.01) | $6.9 \times 10^{-7} Scm^{-1}$ |
| Comparative Example 9 | B (1.59) | $7.1 \times 10^{-7} Scm^{-1}$ |
| Comparative Example 10 | H (0.13), C (0.19) | $6.0 \times 10^{-7} Scm^{-1}$ |

As is apparent from above Tables 1 and 2, it is seen that the lithium-ion conducting oxide having a perovskite structure ($Li_{0.35}La_{0.55}TiO_3$) according to examples 1-12, which includes elements B, N, F and S of 0.05% by mass or more and 1% by mass or less, is improved in ion conductivity more than the lithium-ion conducting oxide according to comparative examples 1-9, which includes none of the elements or includes one of the elements which falls outside the above range.

It is also seen that a lithium-ion conducting oxide having a perovskite structure ($Li_{0.35}La_{0.55}TiO_3$) according to example 13, which includes elements H and C of 0.03% by mass or more and 0.2% by mass or less, is improved in ion conductivity more than the lithium-ion conducting oxide according to comparative examples 1 and 10, which includes none of the elements or includes one of the elements which falls outside the above range.

Example 14

Lithium carbonate, lanthanum hydroxide and niobium oxide were mixed together such that their mol ratio Li:La:Nb is 5:3:2 and heated at 900° C. for twenty-four hours to obtain a lithium lanthanum niobium oxide ($Li_5La_3Nb_2O_{12}$). After that, the lithium-ion conducting oxide was mixed with LiF in a 300:1 ratio by weight and shaped like a pellet. The pellet was heated at 900° C. for twelve hours to obtain a pellet of a lithium-ion conducting oxide containing F.

The F content in the obtained pellet of a lithium-ion conducting oxide was determined by ICP analysis, with the result that it was confirmed that the lithium-ion conducting oxide contained 0.24% by mass of F.

Example 15

A pellet of a lithium-ion conducting oxide containing F was obtained by the same method as that of example 14, except that the lithium lanthanum niobium oxide was mixed with LiF in a 600:1 ratio by weight.

The F content in the obtained pellet of a lithium-ion conducting oxide was determined by ICP analysis, with the result that it was confirmed that the lithium-ion conducting oxide contained 0.09% by mass of F.

Example 16

A pellet of a lithium-ion conducting oxide containing F was obtained by the same method as that of example 14, except that the lithium lanthanum niobium oxide was mixed with LiF in a 100:1 ratio by weight.

The F content in the obtained pellet of a lithium-ion conducting oxide was determined by ICP analysis, with the result that it was confirmed that the lithium-ion conducting oxide contained 0.69% by mass of F.

Example 17

A pellet of a lithium-ion conducting oxide containing B was obtained by the same method as that of example 6, except that the lithium lanthanum niobium oxide was mixed with $LiBO_2$ in a 200:1 ratio by weight.

The B content in the obtained pellet of a lithium-ion conducting oxide was determined by ICP analysis, with the result that it was confirmed that the lithium-ion conducting oxide contained 0.44% by mass of B.

Example 18

A pellet of a lithium-ion conducting oxide containing B was obtained by the same method as that of example 6, except that the lithium lanthanum niobium oxide was mixed with $LiBO_2$ in a 600:1 ratio by weight.

The B content in the obtained pellet of a lithium-ion conducting oxide was determined by ICP analysis, with the result that it was confirmed that the lithium-ion conducting oxide contained 0.11% by mass of B.

Example 19

A pellet of a lithium-ion conducting oxide containing B was obtained by the same method as that of example 6, except that the lithium lanthanum niobium oxide was mixed with $LiBO_2$ in a 100:1 ratio by weight.

The B content in the obtained pellet of a lithium-ion conducting oxide was determined by ICP analysis, with the result that it was confirmed that the lithium-ion conducting oxide contained 0.81% by mass of B.

Comparative Example 11

Lithium carbonate, lanthanum hydroxide and niobium oxide were mixed together such that their mol ratio Li:La:Nb is 5:3:2 and heated at 900° C. for twenty-four hours to obtain a lithium lanthanum niobium oxide ($Li_5La_3Nb_2O_{12}$). The lithium lanthanum niobium oxide was shaped like a pellet and the pellet was heated at 900° C. for twelve hours to obtain a pellet of a lithium-ion conducting oxide.

Comparative Example 12

A pellet of a lithium-ion conducting oxide containing F was obtained by the same method as that of example 6, except that the lithium lanthanum niobium oxide was mixed with LiF in a 40:1 ratio by weight.

The F content in the obtained pellet of a lithium-ion conducting oxide was determined by ICP analysis, with the result that it was confirmed that the lithium-ion conducting oxide contained 1.75% by mass of F.

Comparative Example 13

A pellet of a lithium-ion conducting oxide containing F was obtained by the same method as that of example 6, except that the lithium lanthanum niobium oxide was mixed with LiF in a 2000:1 ratio by weight.

The F content in the obtained pellet of a lithium-ion conducting oxide was determined by ICP analysis, with the result that it was confirmed that the lithium-ion conducting oxide contained 0.03% by mass of F.

Comparative Example 14

A pellet of a lithium-ion conducting oxide containing B was obtained by the same method as that of example 6, except that the lithium lanthanum niobium oxide was mixed with $LiBO_2$ in a 50:1 ratio by weight.

The B content in the obtained pellet of a lithium-ion conducting oxide was determined by ICP analysis, with the result that it was confirmed that the lithium-ion conducting oxide contained 1.55% by mass of B.

Comparative Example 15

A pellet of a lithium-ion conducting oxide containing B was obtained by the same method as that of example 6, except that the lithium lanthanum niobium oxide was mixed with $LiBO_2$ in a 1500:1 ratio by weight.

The B content in the obtained pellet of a lithium-ion conducting oxide was determined by ICP analysis, with the result that it was confirmed that the lithium-ion conducting oxide contained 0.03% by mass of B.

Gold was applied by sputtering to both sides of each of the pellets obtained in above examples 14-19 and comparative examples 11-15 to form an electronic conductive path and calculate an ion conductivity at 25° C. by AC impedance measurement techniques. In this calculation, an arc due to the ion conductivity of crystal bulk was observed on the high-frequency side by the above measurement and an arc due to crystal grain boundary resistance was observed on the low-frequency side; thus, they were obtained as the entire ion conductivity.

The ion conductivities of the pellets obtained in examples 14-19 and comparative examples 11-15 are shown in Table 3 below.

TABLE 3

| | Contained element and its contained amount (% by mass) | Lithium ion conductivity at 25° C. |
|---|---|---|
| Example 14 | F (0.24) | $1.5 \times 10^{-5} \mathrm{Scm}^{-1}$ |
| Example 15 | F (0.09) | $1.0 \times 10^{-5} \mathrm{Scm}^{-1}$ |
| Example 16 | F (0.69) | $1.3 \times 10^{-5} \mathrm{Scm}^{-1}$ |
| Example 17 | B (0.44) | $1.1 \times 10^{-5} \mathrm{Scm}^{-1}$ |
| Example 18 | B (0.11) | $9.7 \times 10^{-6} \mathrm{Scm}^{-1}$ |
| Example 19 | B (0.81) | $9.8 \times 10^{-6} \mathrm{Scm}^{-1}$ |
| Comparative Example 11 | — | $7.9 \times 10^{-7} \mathrm{Scm}^{-1}$ |
| Comparative Example 12 | F (1.75) | $5.6 \times 10^{-7} \mathrm{Scm}^{-1}$ |
| Comparative Example 13 | F (0.03) | $2.2 \times 10^{-6} \mathrm{Scm}^{-1}$ |
| Comparative Example 14 | B (1.55) | $5.6 \times 10^{-7} \mathrm{Scm}^{-1}$ |
| Comparative Example 15 | B (0.03) | $2.2 \times 10^{-6} \mathrm{Scm}^{-1}$ |

As is apparent from above Table 3, it is seen that the lithium-ion conducting oxide having a garnet structure ($Li_5La_3Nb_2O_{12}$) according to examples 14-19, which includes elements B and F of 0.05% by mass or more and 1% by mass or less, is improved in ion conductivity more than the lithium-ion conducting oxide according to comparative examples 11-15, which includes none of the elements or includes one of the elements which falls outside the above range.

Example 20

Production of Positive Electrode

First, $LiCoO_2$, acetylene black, polyvinylidene fluoride and $Li_5La_3Nb_2O_{12}$ including F obtained in example 14 were mixed together in a 50:15:10:25 ratio by mass. This mixture was mixed into an N-methyl-2-pyrolidone solvent to prepare slurry. This slurry was applied to both surfaces of a current collector that is formed of aluminum foil and then dried and pressed to produce a positive electrode having a positive electrode layer whose thickness is 40 μm and whose density is 3.0 g/cm³.

<Production of Negative Electrode>

First, $Li_4Ti_5O_{12}$, acetylene black, polyvinylidene fluoride and $Li_5La_3Nb_2O_{12}$ including F obtained in example 14 were mixed together in a 60:10:10:20 ratio by mass. This mixture was mixed into an N-methyl-2-pyrolidone solvent to prepare slurry. This slurry was applied to both surfaces of a current collector that is formed of aluminum foil and then dried and pressed to produce a negative electrode having a negative electrode layer whose thickness is 36 μm and whose density is 2.4 g/cm³.

<Production of Solid Electrolyte Layer>

$Li_5La_3Nb_2O_{12}$ including F obtained in example 14 and polyvinylidene fluoride were mixed into an N-methyl-2-pyrolidone solvent in a 98:2 ratio by weight to prepare slurry. This slurry was applied to the positive electrode layer of the positive electrode and dried. After that, the slurry was pressed by heat to produce a solid electrolyte layer on the positive electrode layer. The solid electrolyte layer was prepared to have a thickness of 25 μm.

The negative electrode layer of the negative electrode was laminated on the solid electrolyte layer stacked on the positive electrode and then pressed by heat at 80° C. to prepare a laminated electrode group. At this time, the solid electrolyte layer and the positive electrode was increased in area more than the negative electrode. The laminated electrode group was contained in a pack (exterior container) which is formed of a laminated film having a three-layer structure of a nylon layer, an aluminum layer and a polyethylene layer and having a thickness of 0.1 mm and then dried in a vacuum at 80° C. for 24 hours. After that, the pack was heat-sealed completely to produce a solid electrolyte secondary battery.

Example 21

Production of Positive Electrode

First, $LiFePO_4$, acetylene black, polyvinylidene fluoride and $Li_{1.5}Al_{0.5}Ge_{1.5}(PO_4)_3$ including F of 0.06% by mass were mixed into an N-methyl-2-pyrolidone solvent in a 50:15:10:25 ratio by weight to prepare slurry. This slurry was applied to both surfaces of a current collector that is formed of aluminum foil and then dried and pressed to produce a positive electrode having a positive electrode layer whose thickness is 32 μm and whose density is 2.0 g/cm³.

<Production of Negative Electrode>

First, $Li_4Ti_5O_{12}$, acetylene black, polyvinylidene fluoride and $Li_{1.5}Al_{0.5}Ge_{1.5}(PO_4)_3$ including F of 0.06% by mass were mixed into an N-methyl-2-pyrolidone solvent in a 60:10:10:20 ratio by mass to prepare slurry. This slurry was applied to both surfaces of a current collector that is formed of aluminum foil and then dried and pressed to produce a negative electrode having a negative electrode layer whose thickness is 27 μm and whose density is 2.4 g/cm³.

<Production of Solid Electrolyte Layer>

$Li_{1.5}Al_{0.5}Ge_{1.5}(PO_4)_3$ including F of 0.06% by mass and polyvinylidene fluoride were mixed into an N-methyl-2-pyrolidone solvent in a 98:2 ratio by weight to prepare slurry. This slurry was applied to the positive electrode layer of the positive electrode and dried. After that, the slurry was pressed by heat to produce a solid electrolyte layer on the positive electrode layer. The solid electrolyte layer was prepared to have a thickness of 25 μm.

The negative electrode layer of the negative electrode was laminated on the solid electrolyte layer stacked on the positive electrode and then pressed by heat at 80° C. to prepare a laminated electrode group. At this time, the solid electrolyte layer and the positive electrode was increased in area more than the negative electrode. The laminated electrode group was contained in a pack (exterior container) which is formed of a laminated film having a three-layer structure of a nylon layer, an aluminum layer and a polyethylene layer and having a thickness of 0.1 mm and then dried in a vacuum at 80° C. for 24 hours. After that, the pack was heat-sealed completely to produce a solid electrolyte secondary battery.

Comparative Example 16

A solid electrolyte secondary battery was produced by the same method as that of example 20, except that a lithium lanthanum niobium oxide (lithium-ion conducting oxide) including F obtained in example 12 by 1.75% by mass was used as a solid electrolyte.

Charge/discharge tests were conducted on the solid electrolyte secondary battery obtained in example 20 and comparative example 16 on the following conditions under the environment of 45° C. The solid electrolyte secondary battery was charged to 2.8 V at a constant current of 0.1 C rate. The charge time was 15 hours. The solid electrolyte secondary battery was discharged to 1.5 V at different constant currents of 0.1 C and 0.5 C rates.

Charge/discharge tests were also conducted on the solid electrolyte secondary battery obtained in example 21 in the same manner as described above, except that the solid electrolyte secondary battery was charged to 2.5 V.

In the above charge/discharge tests, the ratio of discharge capacity at 0.5 C to discharge capacity at 0.1 C [(0.5 C discharge capacity/0.1 C discharge capacity)×100(%)] was obtained. The result is shown in Table 4 below.

TABLE 4

|  | (0.5 C discharge capacity/0.1 C discharge capacity) × 100 (%) |
|---|---|
| Example 20 | 67 |
| Example 21 | 73 |
| Comparative Example 16 | 50 |

As is apparent from above Table 4, it is seen that the ratio of 0.5 C discharge capacity to 0.1 C discharge capacity in the solid electrolyte secondary battery according to examples 20 and 21, which includes a solid electrolyte layer formed of a lithium-ion conducting oxide including F of 0.05% by mass or more and 1% by mass or less, is higher than that in the solid electrolyte secondary battery according to example 16, which includes a solid electrolyte layer formed of a lithium-ion conducting oxide including F whose content falls outside the above range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid electrolyte secondary battery comprising a positive electrode, a negative electrode and a solid electrolyte layer,
   wherein the solid electrolyte layer comprises a lithium-ion conducting oxide which has a perovskite structure and expressed by $Li_{3x}La_{2/3-x}TiO_3$, where x is $0<x<2/3$, or which has a garnet structure and expressed by $Li_{5+x}La_3M_{2-x}Zr_xO_{12}$, where M is at least one of Nb and Ta, and x is $0\leq x\leq 2$, or which is LISICON, LIPON, or NASICON, and
   the lithium-ion conducting oxide includes at least one element selected from the group consisting of B, N, F and S, a total content of the element in the lithium-ion conducting oxide being 0.05% by mass or more and 1% by mass or less.

2. The solid electrolyte secondary battery of claim 1, wherein the negative electrode comprises an active material, the active material being a titanium composite oxide, a silicon composite oxide, or an iron oxide.

3. A solid electrolyte secondary battery comprising a positive electrode, a negative electrode and a solid electrolyte layer,
   wherein the solid electrolyte layer comprises a lithium-ion conducting oxide which has a perovskite structure and expressed by $Li_{3x}La_{2/3-x}TiO_3$, where x is $0<x<2/3$, or which has a garnet structure and expressed by $Li_{5+x}La_3M_{2-x}Zr_xO_{12}$, where M is at least one of Nb and Ta, and x is $0\leq x\leq 2$, or which is LISICON, LIPON, or NASICON,
   the lithium-ion conducting oxide includes at least one element selected from H and C, a total content of the element in the lithium-ion conducting oxide being 0.05% by mass or more and 0.2% by mass or less.

4. The solid electrolyte secondary battery of claim 3, wherein the negative electrode comprises an active material, the active material being a titanium composite oxide, a silicon composite oxide, or an iron oxide.

5. A battery pack comprising the solid electrolyte secondary battery according to claim 1.

6. A battery pack comprising the solid electrolyte secondary battery according to claim 3.

7. The solid electrolyte secondary battery of claim 1, wherein lithium-ion conducting oxide has a perovskite structure and expressed by $Li_{3x}La_{2/3-x}TiO_3$, where x is $0<x<2/3$.

8. The solid electrolyte secondary battery of claim 1, wherein lithium-ion conducting oxide has a garnet structure and expressed by $Li_{5+x}La_3M_{2-x}Zr_xO_{12}$, where M is at least one of Nb and Ta, and x is $0\leq x\leq 2$.

9. The solid electrolyte secondary battery of claim 1, wherein a total content of the element in the lithium-ion conducting oxide is 0.05% by mass or more and 0.6% by mass or less.

10. The solid electrolyte secondary battery of claim 1, wherein the positive electrode comprises an active material, the active material being a lithium manganese composite oxide, a lithium manganese nickel composite oxide having a spinel structure, a lithium nickel composite oxide, a lithium cobalt composite oxide, a lithium nickel cobalt composite oxide, a lithium manganese cobalt composite oxide, a lithium nickel cobalt manganese composite oxide, or a lithium iron phosphate.

11. The solid electrolyte secondary battery of claim 3, wherein lithium-ion conducting oxide has a perovskite structure and expressed by $Li_{3x}La_{2/3-x}TiO_3$, where x is $0<x<2/3$.

12. The solid electrolyte secondary battery of claim 3, wherein lithium-ion conducting oxide has a garnet structure and expressed by $Li_{5+x}La_3M_{2-x}Zr_xO_{12}$, where M is at least one of Nb and Ta, and x is $0\leq x\leq 2$.

13. The solid electrolyte secondary battery of claim 3, wherein a total content of the element in the lithium-ion conducting oxide is 0.05% by mass or more and 0.1% by mass or less.

14. The solid electrolyte secondary battery of claim 3, wherein the positive electrode comprises an active material, the active material being a lithium manganese composite oxide, a lithium manganese nickel composite oxide having a spinel structure, a lithium nickel composite oxide, a lithium cobalt composite oxide, a lithium nickel cobalt composite oxide, a lithium manganese cobalt composite oxide, a lithium nickel cobalt manganese composite oxide, or a lithium iron phosphate.

* * * * *